United States Patent
Pansini

[11] 3,727,632
[45] Apr. 17, 1973

[54] AUTOMATIC CHLORINATOR, PLUNGER SELECTOR TYPE

[76] Inventor: Andrew L. Pansini, 180 Los Cerros Dr., San Rafael, Calif.

[22] Filed: Jan. 18, 1971

[21] Appl. No.: 107,141

[52] U.S. Cl. .................... 137/268, 222/67, 222/453
[51] Int. Cl. ........ E03b 11/00, E03c 1/046, F17d 1/00
[58] Field of Search .................... 137/268, 391, 434, 137/439; 210/119, 123, 134; 222/52, 56, 59, 66, 67, 68, 448, 453; 4/227

[56] References Cited

UNITED STATES PATENTS

| | | | |
|---|---|---|---|
| 517,575 | 4/1894 | Knapp et al. | 137/436 |
| 2,587,388 | 2/1952 | Ryder, Jr. | 222/67 X |
| 2,320,128 | 5/1943 | Hall | 222/67 X |
| 2,054,881 | 9/1936 | Saunders | 222/453 X |
| 1,525,828 | 2/1925 | Reeve | 222/453 X |
| 704,032 | 7/1902 | Harris | 222/453 X |
| 2,508,170 | 5/1950 | Kaufmann | 137/268 X |
| 3,089,508 | 5/1963 | Schulze et al. | 137/268 X |
| 3,095,005 | 6/1963 | Thompson | 137/268 |
| 3,356,460 | 12/1967 | King et al. | 137/391 X |
| 3,474,817 | 10/1969 | Bates et al. | 137/268 |
| 2,242,693 | 5/1941 | Benson | 137/434 X |
| 2,838,208 | 6/1958 | Levit | 222/453 X |
| 3,011,515 | 12/1961 | Kravagna | 137/439 X |
| 3,334,649 | 8/1967 | Thompson | 137/439 X |

Primary Examiner—Henry T. Klinksiek
Assistant Examiner—Robert J. Miller
Attorney—Naylor & Neal

[57] ABSTRACT

This invention is a non-pressurized granular feeder operable due to a change of water levels within the chlorinator. When the filtering system of a swimming pool shuts off the suction power within the above ground piping draws water from the chlorinator back through the pressure line of the system. The pressure or incoming line is located below the suction or normal outgoing line to the chlorinator. This is the only chlorinator of this type, to my knowledge, that allows the chlorine solution to be placed back into the circulation system downstream of the pump and filter. This could be accomplished by setting the timer to go off again for a few minutes shortly after the filtering cycle has started.

6 Claims, 3 Drawing Figures

PATENTED APR 17 1973 3,727,632

INVENTOR.
ANDREW L. PANSINI
BY
Naylor & Neal
ATTORNEYS

AUTOMATIC CHLORINATOR, PLUNGER SELECTOR TYPE

By having the suction outlet of the chlorinator located above the incoming valve a constant high water level can be maintained regardless of how slow the incoming water flow may become due to a dirty filter. By not requiring a constant high incoming pressure the unit may be hooked up after the filter and always receive clean water. Chlorinators that have their incoming valves located above their suction valves have encountered difficulty maintaining a constant high water level as the filter gets dirty and incoming water slows down. As a result the practice with other chlorinators is to recommend hooking the incoming line to the line between the pump and the filter where the pressure is always sufficiently high. However, here the water is dirty and the valves eventually leak when the system is off, allowing air to get into the system which causes the pump to lose its prime.

Another important feature of this chlorinator is the secondary lower plunger which normally has the lower seal closed when the filtering system is running. This prevents moisture from getting into the lower or shot chamber which has been a problem with other chlorinators.

An adjustable baffle divider plate separates the end of the tank where the chemical is dropped from the outlet line valve. This allows very slow dispersing of the chemical into the body of water to be treated.

The plunger can be unscrewed from its float so that it can be removed with the hopper to thus ensure that chemical will not be spilled during servicing.

Figure 1:
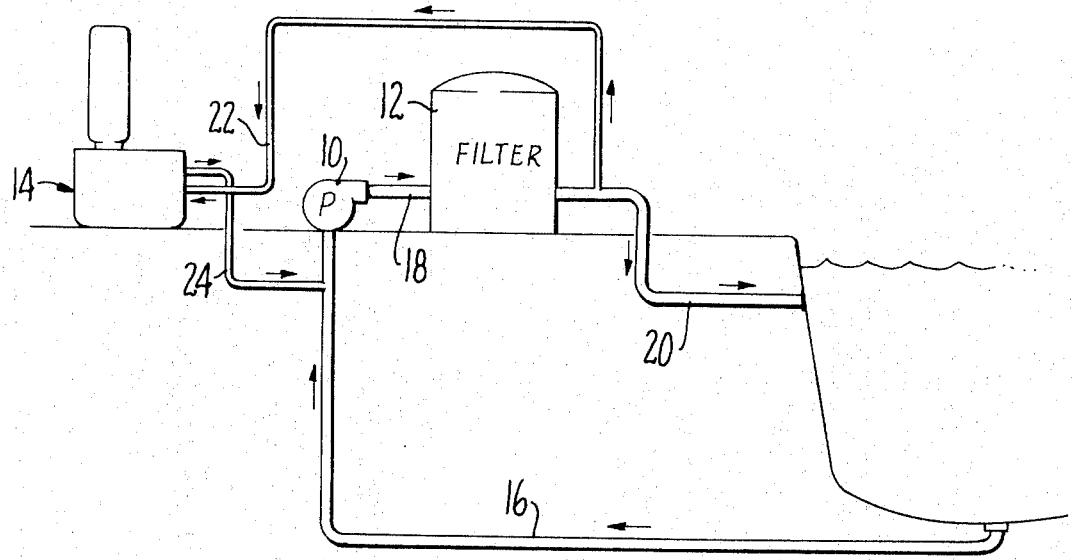
FIG. 1 is a schematic showing of a pool water handling system including the chlorinator of the invention.

The water handling and treatment system of FIG. 1 includes pump 10, filter 12, chlorinator 14, pump inlet 16, line 18 connecting the pump to the filter, return line 20 from the filter to the pool, pressure line 22 connecting line 20 and chlorinator 14 and suction line 24 connecting the chlorinator and line 16.

Figure 2:
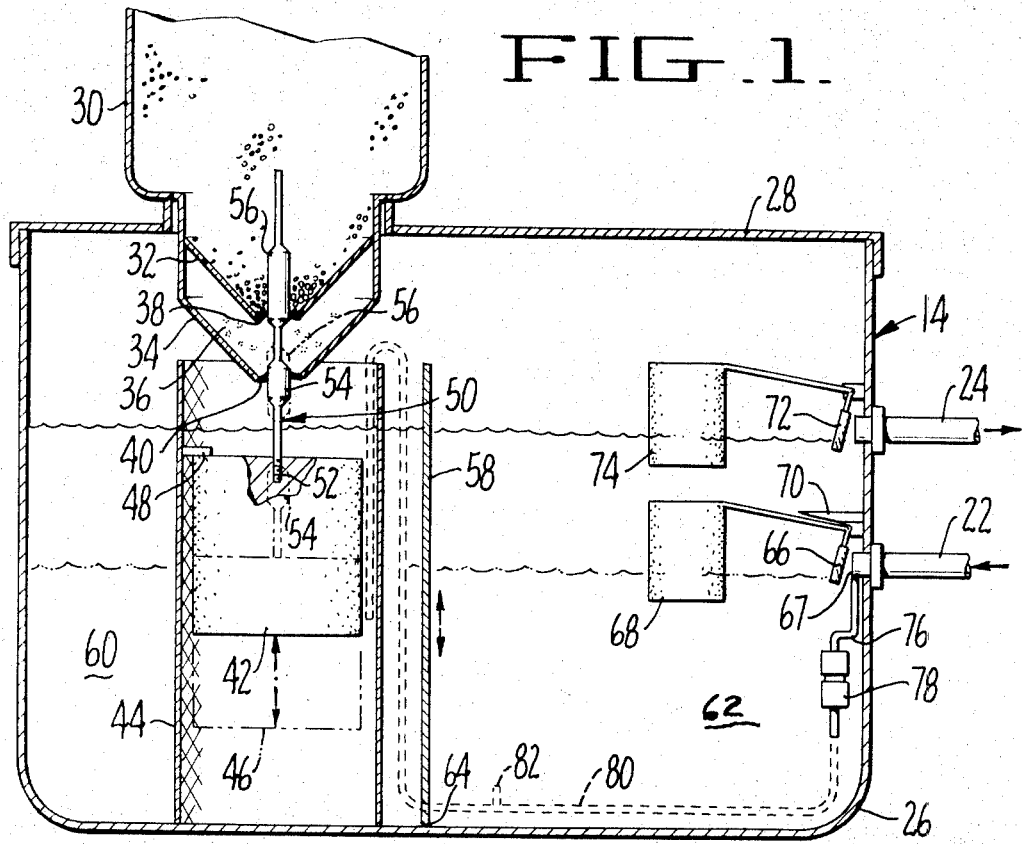
FIG. 2 is a semi-schematic view which is set forth to illustrate the invention.

With reference to FIG. 2, the chlorinator 14 comprises water tank 26, tank cover 28, granulized chlorine container 30 supported by cover 28, an upper cup 32 and a lower cup 34 defining therebetween a chlorine granular shot chamber 36, diaphragms 38 and 40, a weighted float 42 disposed for vertical movement within a guide cylinder 44, means 46 to limit downward movement of float 42 when the filter system is turned off, a stop 48 to limit upward movement of float 42 when the filter system is turned on, a plunger 50 removably connected by screw means 52 to float 42 and having spaced apart valve elements 54 and 56 adapted to selectively open and close diaphragm valves 40 and 38, a baffle 58 dividing tank 26 into two chambers 60 and 62 and being vertically adjustable to control the size of the opening 64 and thereby control the rate of chlorine concentrate flow from chamber 60 to chamber 62, check valve 66 for pressure line 22 under the control of a weighted float 68 and float stop member 70, a check valve 72 for suction line 24 under the control of weighted float 74, a water inlet line 76 adapted to admit water into chamber 62 from line 22, and check valve 78 in line 76.

Chamber 36 fills with chlorine shot when the filter system is off; chamber 36 discharges into cylinder 44 after the filter has been turned on, i.e., when the valve control element 56 in moving upwardly from the dotted line to the solid line position of FIG. 2.

Inasmuch as valve 66 may be difficult to open because of the weighted float 68 when the water pressure is low, line 76 and check valve 78 are provided to allow the water to easily enter the chlorinator and raise the float 68 to thereby open valve 66.

For the embodiment of the invention described, cylinder 44 is perforate for passage of the chlorine concentrate from the cylinder to chamber 60.

For a further embodiment, cylinder 44 is made imperforate, the inlet end 67 of line 22 is plugged, and a siphon hose 80 is employed to interconnect the interior of the cylinder and line 76, hose 80 being provided with a small outlet 82.

When the filter system is turned on, incoming water overflows the guide tank 44, and the water level in tank 26 is maintained by suction line valve 72. When the filter system is turned off, water in the guide tank 44 is siphoned out of that tank into the tank 26 by means of the hose or pipe 80 and the small outlet 82 until the water levels reach a common level. Valve 72 then closes and with valve 78 serves to trap the remaining water within the chlorinator. This lowering of the water level in the guide tank allows the plunger and float assembly to lower and chlorine to enter the chamber 36 ready to be dispensed into the liquid when the filter system is again turned on.

Figure 3:
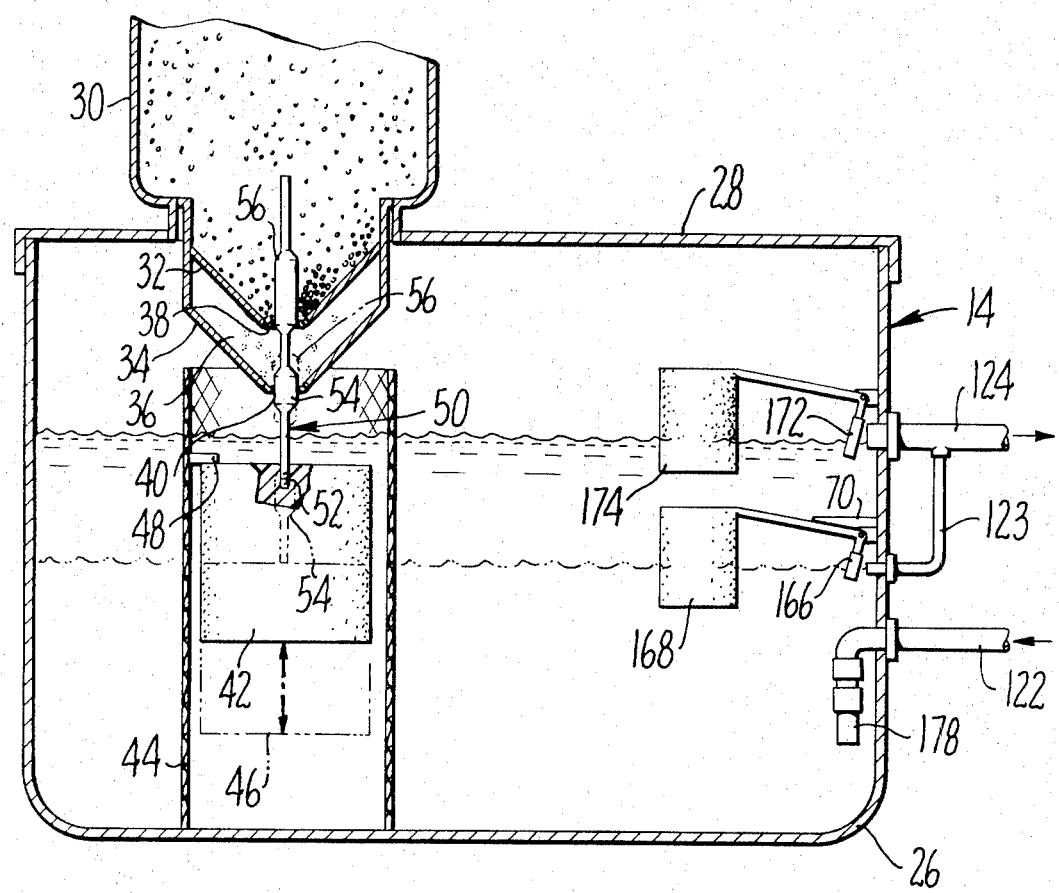
FIG. 3 is a semi-schematic view illustrating the invention.

In the embodiment of FIG. 3, input water enters through line 122 and one-way valve 178 and rises to open valves 166 and 172. Small orifice line 123 connects output line 124 with a lower level within tank 26, the open end or orifice of line 123 being sufficiently small so as not to prevent the water level within the tank from reaching the tank outlet to line 124. When the filter system is turned off, valve 172 closes and water is bled from the tank through lines 123 and 124 until the water level drops to enable float 168 to drop and cause valve 166 to close line 123.

What is Claimed is:

1. An automatic feeder comprising a container, a chemical reservoir associated with the container in delivery relation thereto, means including a liquid level responsive float and slide valve means carried thereby and movable therewith operable to release a chemical from said reservoir into said container for dissolution in said liquid as said float moves, a liquid inlet line connected to said container and normally adapted to deliver liquid under pressure thereto to raise the level of liquid therein, a liquid outlet line connected to said container at a level above that of said inlet line to enable circulation of liquid out of said container while liquid is being delivered to said container through said inlet line, and means to cause the flow of liquid out of said container through said inlet line upon the cessation of flow of liquid under pressure through said inlet line into said container, said last-mentioned means including a pump having its output side connected to said inlet line and means operable to de-energize the pump and thereby cause said cessation of flow.

2. The automatic feeder of claim 1, including a pair of control valves for said inlet line, one of said valves being adapted to be closed in response to a predetermined liquid level in said container and the other of said valves being adapted to be closed in response to a suction or negative pressure condition.

3. An automatic feeder comprising a first liquid container, a second liquid container, a chemical reservoir associated with the first container in delivery relation thereto, float and plunger means associated with said first container adapted to release a chemical from said reservoir into said first container for dissolution in the liquid therein, a liquid inlet line in communication with said first container, a liquid outlet line in communication with said second container, means for liquid flow from said first to said second container, valve means associated with said outlet line adapted to maintain a liquid level in said second container below that of said first container as liquid flows through said feeder, and means operative to siphon liquid from said first container into said second container to equalize the liquid levels within said containers.

4. An automatic feeder comprising a container, liquid circulation means therefor including liquid inlet and outlet lines operable in normal operation to simultaneously deliver liquid into said container through said inlet and out of said container through said outlet, a chemical reservoir associated with said container including spaced apart wall members defining a chamber, aligned first and second ports in said wall members to, respectively, allow the flow of chemical material from said reservoir to said chamber and from said chamber to said container, valve means for said ports including first and second spaced lands, and float means supporting said valve means and operative to dispose said second land in closing relation to said second port during said normal operation of said liquid circulation means.

5. An automatic feeder comprising a liquid container, adjustable means dividing said container into first and second chambers whereby the rate of flow communication between said chambers is variably controllable, chemical supply means associated with said first chamber, means including float means with-in said first chamber to controllably actuate said supply means, a liquid inlet line connected to said container, and a liquid outlet line connected to said second chamber.

6. An automatic feeder comprising a liquid container having a liquid inlet and a liquid outlet line connected thereto, chemical supply means associated with said container and adapted to discharge a chemical into the container, float means to actuate the supply means, and a pair of valves in control relation to the outlet line, one of said valves being adapted to control the level of fluid within the container as water flows through the container, the other of said valves being adapted to control the level of fluid within the container when water ceases to flow through the container.

* * * * *